(12) United States Patent
Williamson

(10) Patent No.: US 9,094,647 B2
(45) Date of Patent: Jul. 28, 2015

(54) AMOLED TELEVISION FRAME

(76) Inventor: James Williamson, Tuscaloosa, AL (US)

( * ) Notice: Subject to any disclaimer, the term of this patent is extended or adjusted under 35 U.S.C. 154(b) by 911 days.

(21) Appl. No.: 13/306,881

(22) Filed: Nov. 29, 2011

(65) Prior Publication Data

US 2012/0133848 A1    May 31, 2012

Related U.S. Application Data

(60) Provisional application No. 61/417,799, filed on Nov. 29, 2010.

(51) Int. Cl.
*H04N 5/64*  (2006.01)
*H04N 5/66*  (2006.01)

(52) U.S. Cl.
CPC ... *H04N 5/64* (2013.01); *H04N 5/66* (2013.01)

(58) Field of Classification Search
None
See application file for complete search history.

(56) References Cited

U.S. PATENT DOCUMENTS

| | | | |
|---|---|---|---|
| 7,337,024 B1 * | 2/2008 | Graham | 700/79 |
| 2005/0168661 A1 * | 8/2005 | Maxson | 348/825 |
| 2010/0097293 A1 * | 4/2010 | McMahon | 345/1.1 |

* cited by examiner

*Primary Examiner* — Sath V Perungavoor
*Assistant Examiner* — Kate Luo
(74) *Attorney, Agent, or Firm* — The Law Office of Jerry D. Haynes

(57) ABSTRACT

A LED television mounting frame assembly comprising: a frame, where the frame holds an aluminum housing; a polyvision glass, where the polyvision glass is stored within the frame; a LED television screen stored within the frame one side of the polyvision glass and placed on a viewing side of the frame; an art piece, where the art piece is stored on the opposite side of the polyvision glass, wherein said art piece is visible when LED television screen is not in used and is revealed through the polyvision glass; a back cover, where the cover is placed upon a back side of the frame; and electronic control systems, where said control systems provide a means for controlling the viewing side of the frame.

6 Claims, 3 Drawing Sheets

US 9,094,647 B2

AMOLED TELEVISION FRAME

CROSS REFERENCE TO OTHER APPLICATIONS

This application claims priority to U.S. Provisional Application Ser. No. 61/417,799 filed on Nov. 29, 2010.

BACKGROUND OF THE INVENTION

1. Field of Invention

The present invention relates to a system and frame that conceals an idle flat screen television during non-use.

2. Description of Related Art

Flat panel displays are used in various applications such as for computers, televisions, monitors and other common video display applications. The flat panel displays are very popular due to their lighter and thinner composition as opposed to the traditional television and video displays that used cathode ray tubes. The flat panel display television has replaced the traditional cathode ray tube television in many consumers' homes. Since the advent of the flat panel display television various mounting apparatuses and other support systems have been developed to accommodate the relatively new television design. Some of the mounting devices for the flat panel televisions are placed on the floor and allow the panel to sit on a mounting device in an upright position in a cabinet type of fashion. Other devices have been developed for mounting the display directly on the wall similar to a painting. Wall mounted television panels are the most advantageous mounting schemes due to the fact that the television is placed against the wall and less space is consumed by the television in the floor area. The wall mounting of flat panel televisions is also popular in restaurants and bars due to the easy availability of anchoring systems to mount the panels on columns and beams that may exist in the restaurant.

Although many individuals enjoy the ability to wall mount the flat panel television in a home, one drawback is the inability to use the wall space for traditional wall decorations such as a painting or a photograph. When the flat screen TV isn't being used it's merely a blank screen that is on the wall of a consumer. This blank screen may distract from the overall esthetic view of the room when the television is not in use. Consequently it would be advantageous to have the ability to see through the television screen to a framed decorative art display when the television isn't in use. Such an advantage would enable the user to interchange and to adorn the wall display as desired.

SUMMARY OF THE INVENTION

The present invention relates to a LED television mounting frame assembly comprising: a frame, where the frame holds an aluminum housing; a polyvision glass, where the polyvision glass is stored within the frame; a LED television screen stored within the frame one side of the polyvision glass and placed on a viewing side of the frame; an art piece, where the art piece is stored on the opposite side of the polyvision glass, wherein said art piece is visible when LED television screen is not in used and is revealed through the polyvision glass; a back cover, where the cover is placed upon a back side of the frame; and electronic control systems, where said control systems provide a means for controlling the viewing side of the frame. The back cover may include a depression fastener, where the depression fastener adjoins the back cover to the frame. The back cover may also include a concaved housing. In one particular embodiment, the back cover includes a front side and an angled portion near the bottom.

DETAILED DESCRIPTION

The present invention relates to a frame that utilizes a polyvision glass behind a LED television screen and in front of an artwork housing to provide a television viewing system that is capable of concealing the television screen when not in use. This present invention enables the user to display decorative artwork or a photograph when the television is not being used and thus conceals the blank or idle LED television screen. When the television is turned on the artwork is concealed so that viewers may view the television screen.

The present invention provides a decorative frame that houses an AMOLED television screen and artwork where a polyvision glass is positioned between the LED television screen and the artwork therefore when the television is powered off the artwork that is mounted in the frame is revealed. When television is in an on position the artwork is concealed and viewers can watch any programming being broadcasted via the LED television screen.

Figure 1:
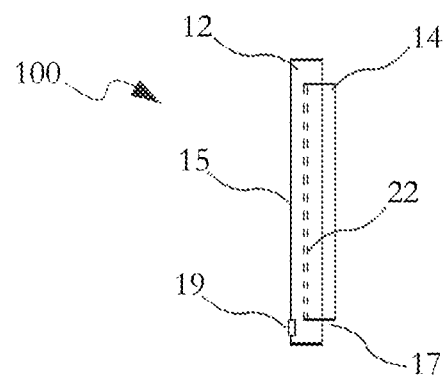
FIG. 1 depicts a side view of the AMOLED frame according to the present invention.
Figure 2:
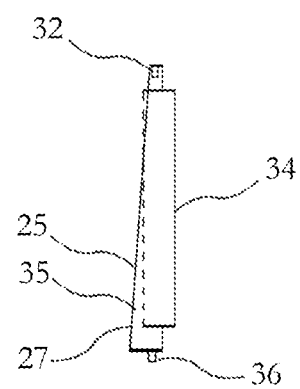
FIG. 2 depicts a side view of the back cover of the AMOLED frame according to the present invention.

In reference to FIG. 1, a side view of an AMOLED frame assembly 100 according to the present invention is depicted. The frame assembly 100 includes a frame 12 that holds an aluminum housing 14. Within the frame 12 is a polyvision glass 22 that is placed between a LED television screen 42 and an art piece 44. A front side 15 is provided for viewing and controls 19 for a LED television are available along the front side 15. Insertion holes 17 are located inside the aluminum housing 14 for inserting a back cover 35, shown in FIG. 2, provided along the rear side of the frame 12. FIG. 2 depicts a side view of the back cover 35, where the cover 35 is placed upon the backside of the frame 12 as displayed in FIG. 1. The back cover 35 includes a depression fastener 32 that adjoins the cover 35 to the frame 12. A concaved housing 34 is provided in the back cover 35 to allow for the insertion of connective cords for the television display. A front side 25 of the back cover 35 adjoins with the housing 14 of the frame 12. As shown, the front side 25 of the back cover 35 has an angled portion 27 near the bottom. Inserts 36 are also provided which are used for insertion into insertion holes 17 of FIG. 1 in the Aluminum Housing 14.

Figure 3:
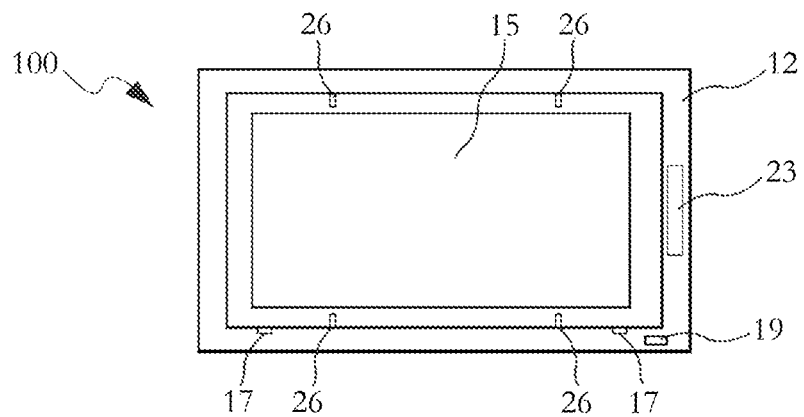
FIG. 3 depicts a back view of the AMOLED frame according to the present invention.
Figure 5:
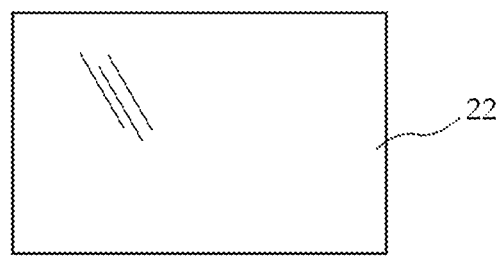
FIG. 5 depicts a polyvision glass that is placed behind a LED television screen and in front of an artwork display.

FIG. 3 depicts the back view of frame assembly 100. The frame 12 includes an AMOLED electronic housing 23 on one side thereof. The electronics within the housing 23 are related to the functionality of the LED television screen 42 on the front side 15 of the frame assembly 100. Screen Holders 26 are provided at the top and the bottom of the frame 12 for the insertion of the LED television screen 42. The LED television screen 42 is placed at the front of the frame 12 and a polyvision glass 22, as shown in FIG. 5, is placed behind the LED television screen 42. The aluminum housing 14 also includes insertion holes 17 that receive the inserts 36 provided on the back cover 35. Control modules 19 are provided at the bottom portion of the frame 12.

Figure 4:
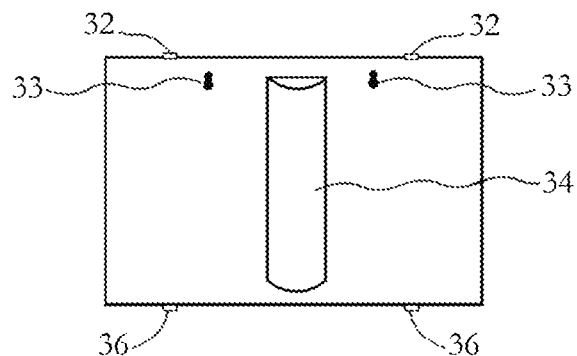
FIG. 4 depicts a view of the back cover utilized on the AMOLED frame according to the present invention.

A view of the outer portion of the back cover 35 is depicted in FIG. 4. A view of the conclave cord housing 34 is provided at the center of the back cover 35 along with hanging mechanisms 33 at the top of the back cover. The hanging mechanisms 33 provide a means to mount the frame assembly 100 onto the wall. Further, the inserts 36, which provide a means for insertion into the aluminum housing 14, are clearly displayed along with the clip fasteners 32 that are provided at the top of the back cover 35.

Figure 6:
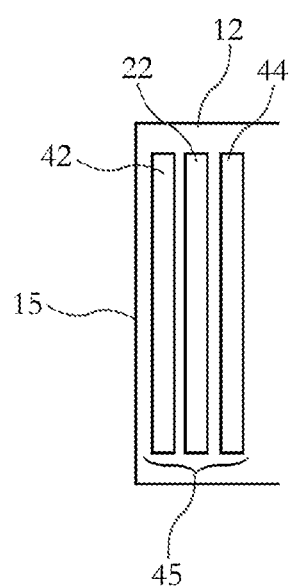
FIG. 6 depicts a detail view of the LED television screen—polyvision glass—artwork display configuration according to the present invention.

In a completely assembled position, the frame assembly 100 includes the LED television screen 42, the polyvision glass 22 to the rear of the LED television screen 42 and behind the polyvision glass 22, the art piece 44 piece may be placed for display when the LED television screen 42 is idle. FIG. 6 shows a detail view of the placement of the LED television screen 42 in front of the polyvision glass 22. The art piece 44 is positioned behind the polyvision glass 22. Consequently, the frame assembly 100 allows for the display of art or photograph as opposed to a blank screen that would normally be displayed when the television screen is off. The frame assembly according to the present invention is uniquely designed to provide additional options for home decor when using a wall-mounted flat panel television display screen. The instant invention has been shown and described in what it considers to be the most practical and preferred embodiments. It is recognized, however, that departures may be made there from within the scope of the invention and that obvious modifications will occur to a person skilled in the art.

What is claimed is:

1. A LED television mounting frame assembly comprising:
   a. a frame, where the frame holds an aluminum housing;
   b. a polyvision glass, where the polyvision glass is stored within the frame;
   c. a LED television screen stored within the frame one side of the polyvision glass and placed on a viewing side of the frame;
   d. an art piece, where the art piece is stored on the opposite side of the polyvision glass, wherein said art piece is visible when LED television screen is not in used and is revealed through the polyvision glass;
   e. a back cover, where the cover is placed upon a back side of the frame; and
   f. electronic control systems, where said control systems provide a means for controlling the viewing side of the frame.

2. The LED television mounting frame assembly according to claim 1, where the back cover includes a depression fastener, where the depression fastener adjoins the back cover to the frame.

3. The LED television mounting frame assembly according to claim 1, where the back cover includes a concaved housing.

4. The LED television mounting frame assembly according to claim 2, where the back cover includes a front side and an angled portion near the bottom.

5. The LED television mounting frame assembly according to claim 1, where the frame includes an electronic housing on one side thereof.

6. The LED television mounting frame assembly according to claim 1 further including screen holders at the top and bottom of the frame for inserting the LED television screen.

* * * * *